(12) United States Patent
Quek

(10) Patent No.: US 9,170,658 B2
(45) Date of Patent: Oct. 27, 2015

(54) SELF-CENTERING TACTILE THUMB JOYSTICK FOR USE ON A TOUCH SCREEN

(75) Inventor: Joo Hai Quek, Singapore (SG)

(73) Assignee: JoyTact Pte Ltd, Singapore (SG)

( * ) Notice: Subject to any disclaimer, the term of this patent is extended or adjusted under 35 U.S.C. 154(b) by 147 days.

(21) Appl. No.: 13/806,847

(22) PCT Filed: Jun. 6, 2012

(86) PCT No.: PCT/SG2012/000205
§ 371 (c)(1),
(2), (4) Date: Dec. 25, 2012

(87) PCT Pub. No.: WO2013/052008
PCT Pub. Date: Apr. 11, 2013

(65) Prior Publication Data
US 2013/0249830 A1 Sep. 26, 2013

(30) Foreign Application Priority Data
Oct. 7, 2011 (WO) ................. PCT/SG2011/000350

(51) Int. Cl.
*G06F 3/033* (2013.01)
*G06F 3/0338* (2013.01)
*G06F 3/041* (2006.01)
*G06F 3/044* (2006.01)
*H01H 25/04* (2006.01)

(52) U.S. Cl.
CPC .............. *G06F 3/033* (2013.01); *G06F 3/0338* (2013.01); *G06F 3/044* (2013.01); *G06F 3/0416* (2013.01); *H01H 25/04* (2013.01); *H01H 2239/006* (2013.01)

(58) Field of Classification Search
CPC ... G06F 3/033; G06F 3/0354; G06F 3/03543; G06F 3/03544; G06F 3/0338; H01H 25/04
USPC .............. 200/179, 8 R, 6 A, 4, 5 R, 17 R, 18; 345/156–169, 173; 463/38; 700/85; 348/211.7; 361/679.1, 679.18; 74/471
See application file for complete search history.

(56) References Cited

U.S. PATENT DOCUMENTS

| | | | |
|---|---|---|---|
| 6,760,006 B2 * | 7/2004 | Arita et al. ..................... | 345/156 |
| 6,903,662 B2 * | 6/2005 | Rix et al. ......................... | 341/22 |
| 7,167,159 B2 * | 1/2007 | Bailey ............................ | 345/161 |
| 7,310,083 B2 * | 12/2007 | Hagiwara et al. ............. | 345/156 |
| 7,391,410 B2 | 6/2008 | Lutnaes | |

(Continued)

OTHER PUBLICATIONS

International Search Report for PCT/SG2012/000205 from the Australian Patent Office completed on Jul. 26, 2012 and mailed Jul. 31, 2012 (4 pages).

*Primary Examiner* — Temesgh Ghebretinsae
*Assistant Examiner* — Michael J Jansen, II
(74) *Attorney, Agent, or Firm* — Pyprus Pte Ltd

(57) ABSTRACT

The present invention provides a self-centering, tactile thumb joystick for use to control a virtual directional pad displayed on a touch screen of an electronic gadget. The thumb joystick is removeably mounted on the touch screen so that movement of a puck via a stem and a button operates the virtual directional pad to control a software running in the electronic gadget. A resilient member, in the form of an annular spring or garter spring, biasing inwardly against a wall element formed around an opening of a hollow housing of the thumb joystick centers the puck when a user releases activating the button.

9 Claims, 15 Drawing Sheets

(56) References Cited

U.S. PATENT DOCUMENTS

| | | |
|---|---|---|
| 7,489,296 B2 * 2/2009 | Nishino et al. | 345/157 |
| 7,570,247 B2 * 8/2009 | Harley et al. | 345/156 |
| 7,733,327 B2 * 6/2010 | Harley et al. | 345/157 |
| 7,800,581 B2 * 9/2010 | Lye et al. | 345/156 |
| 7,889,176 B2 * 2/2011 | Harley et al. | 345/157 |
| 8,199,114 B1 * 6/2012 | Jaeger et al. | 345/173 |
| 8,368,662 B2 * 2/2013 | Argiro | 345/173 |
| 8,462,133 B2 * 6/2013 | Lynch et al. | 345/174 |
| 8,599,162 B2 * 12/2013 | Argiro | 345/173 |
| 8,686,959 B2 * 4/2014 | Payne | 345/173 |
| 8,994,666 B2 * 3/2015 | Karpfinger | 345/173 |
| 9,041,665 B2 * 5/2015 | Skinner | 345/173 |
| 2001/0007449 A1 * 7/2001 | Kobachi et al. | 345/156 |
| 2002/0064018 A1 * 5/2002 | Suzuki | 361/288 |
| 2002/0167421 A1 * 11/2002 | Fo et al. | 341/31 |
| 2002/0190945 A1 * 12/2002 | Arita et al. | 345/156 |
| 2003/0071785 A1 * 4/2003 | Arita et al. | 345/156 |
| 2004/0056781 A1 * 3/2004 | Rix et al. | 341/20 |
| 2004/0222968 A1 * 11/2004 | Endo et al. | 345/161 |
| 2005/0024327 A1 * 2/2005 | Hagiwara et al. | 345/156 |
| 2005/0110747 A1 * 5/2005 | Harley et al. | 345/156 |
| 2005/0110754 A1 * 5/2005 | Harley et al. | 345/160 |
| 2006/0003840 A1 * 1/2006 | Bailey | 463/36 |
| 2006/0022937 A1 * 2/2006 | Matta et al. | 345/156 |
| 2006/0022956 A1 * 2/2006 | Lengeling et al. | 345/173 |
| 2006/0044260 A1 * 3/2006 | Harley et al. | 345/156 |
| 2006/0055667 A1 * 3/2006 | Matta et al. | 345/156 |
| 2006/0132436 A1 * 6/2006 | Wenstrand et al. | 345/157 |
| 2006/0139323 A1 * 6/2006 | Harley et al. | 345/157 |
| 2006/0158429 A1 * 7/2006 | Harley et al. | 345/157 |
| 2006/0192754 A1 * 8/2006 | Sachs et al. | 345/157 |
| 2006/0256090 A1 * 11/2006 | Huppi | 345/173 |
| 2006/0267934 A1 * 11/2006 | Harley et al. | 345/157 |
| 2006/0290665 A1 * 12/2006 | Matta et al. | 345/157 |
| 2007/0063974 A1 * 3/2007 | Slotta | 345/161 |
| 2007/0091065 A1 * 4/2007 | Misek | 345/157 |
| 2007/0139374 A1 * 6/2007 | Harley | 345/157 |
| 2007/0247423 A1 * 10/2007 | Harley et al. | 345/157 |
| 2007/0290997 A1 * 12/2007 | Harley et al. | 345/157 |
| 2008/0018596 A1 * 1/2008 | Harley et al. | 345/157 |
| 2008/0024441 A1 * 1/2008 | Harley et al. | 345/157 |
| 2008/0042971 A1 * 2/2008 | Sachs | 345/156 |
| 2008/0042974 A1 * 2/2008 | Sachs et al. | 345/157 |
| 2008/0068333 A1 * 3/2008 | Lye et al. | 345/156 |
| 2008/0164076 A1 * 7/2008 | Orsley | 178/18.01 |
| 2008/0192025 A1 * 8/2008 | Jaeger et al. | 345/173 |
| 2008/0211779 A1 * 9/2008 | Pryor | 345/173 |
| 2008/0238879 A1 * 10/2008 | Jaeger et al. | 345/173 |
| 2008/0246735 A1 * 10/2008 | Reynolds et al. | 345/173 |
| 2009/0027333 A1 * 1/2009 | Orsley et al. | 345/157 |
| 2010/0026635 A1 * 2/2010 | Dimitrov et al. | 345/173 |
| 2010/0079403 A1 * 4/2010 | Lynch et al. | 345/174 |
| 2010/0090974 A1 * 4/2010 | Jung et al. | 345/173 |
| 2010/0309130 A1 * 12/2010 | Zhao et al. | 345/168 |
| 2010/0328203 A1 * 12/2010 | Hsu | 345/157 |
| 2011/0006995 A1 * 1/2011 | Jo | 345/169 |
| 2011/0157056 A1 6/2011 | Karpfinger | |
| 2011/0199325 A1 * 8/2011 | Payne | 345/173 |
| 2011/0227823 A1 * 9/2011 | Kim et al. | 345/157 |
| 2011/0227841 A1 * 9/2011 | Argiro | 345/173 |
| 2011/0260969 A1 * 10/2011 | Workman | 345/161 |
| 2012/0062460 A1 * 3/2012 | Toyota et al. | 345/161 |
| 2012/0112859 A1 * 5/2012 | Park et al. | 335/205 |
| 2012/0133615 A1 * 5/2012 | Argiro | 345/174 |
| 2012/0169597 A1 * 7/2012 | Liotta | 345/161 |
| 2012/0176312 A1 * 7/2012 | Yang | 345/158 |
| 2012/0279642 A1 * 11/2012 | Wresh | 156/249 |
| 2013/0002571 A1 * 1/2013 | Skinner | 345/173 |
| 2013/0093702 A1 * 4/2013 | Argiro | 345/173 |
| 2013/0120258 A1 * 5/2013 | Maus | 345/161 |
| 2013/0162531 A1 * 6/2013 | Lin et al. | 345/157 |
| 2013/0215029 A1 * 8/2013 | Comer, Jr. | 345/161 |
| 2013/0249808 A1 * 9/2013 | Silk et al. | 345/173 |
| 2014/0002358 A1 * 1/2014 | Bruwer | 345/158 |
| 2014/0049475 A1 * 2/2014 | Argiro | 345/172 |
| 2014/0083833 A1 * 3/2014 | Desplaines et al. | 200/6 A |
| 2014/0247246 A1 * 9/2014 | Maus | 345/174 |

* cited by examiner

SELF-CENTERING TACTILE THUMB JOYSTICK FOR USE ON A TOUCH SCREEN

RELATED PATENT APPLICATIONS

This patent application is based on PCT/SG2012/000205, which claims priority from PCT/SG2011/000350 filed on 7 Oct. 2011, and the entire disclosure is incorporated in this specification.

FIELD OF INVENTION

The present invention relates to a self-centering tactile thumb joystick for removeable mounting on a touch screen of an electronic device. By moving the self-centering tactile thumb joystick over a virtual directional pad displayed on the touch screen, it allows a user to control operation of a software, such as a game, running on the electronic device.

BACKGROUND

Many electronic devices now have a touch screen 10 for inputting data or selecting an input from a menu. Such touch screen 10 includes a display screen 12 and a touch sensing system 14 placed on top of the display screen. The touch sensing system 14 includes a transparent sensing circuit for allowing a user to input or make a selection via virtual buttons. When a user touches a virtual button, a signal is sent from the touch sensing circuit to a controller in the electronic device to register an input or selection. For example, the touch sensing system 14 may be a resistive or a capacitive type. A resistive touch screen will require mechanical pressure to be exerted on a virtual button on the touch screen, such as one button of a 4-point or 360 degree directional pad. A capacitive touch screen will not require mechanical pressure to be exerted on a virtual button; it works by the virtual button sensing a capacitance change when a user's linger or thumb touches it. As a touch screen is flat and smooth, activating a virtual button does not give a tactile feedback to a user; lack of a tactile feedback on a touch screen 10 gives a poor sensory experience, especially to a user for playing a game, say on an iPad or smartphone, when the user can rarely take one's eyes away from the screen.

To provide a solution, US publication no. 2011/0157056 by Karpfinger, describes a physical button that provides a tactile feel and a sensed touch on a touch screen. In one embodiment, the button is disposed in a frame. The frame is deformable and when a force on the button is removed, the frame causes the button to revert back to its unactivated position.

In another approach, U.S. Pat. No. 7,391,410 assigned to Sony Ericsson Mobile, describes a joystick that is pivoted on a lid disposed over a touch screen. The joystick has a pin in contact with the touch screen. Movement of the joystick is thus detected on the touch screen.

Despite availability of the above prior art devices, there is still a need for another touch screen activating device that provides tactile feedback to a user, especially a device that is removeably mounted on a touch screen, for example, for a user to play a game or a user to operate a touch screen remote controller for a television set and so on.

SUMMARY

The following presents a simplified summary to provide a basic understanding of the present invention. This summary is not an extensive overview of the invention, and is not intended to identify key features of the invention. Rather, it is to present some of the inventive concepts of this invention in a generalised form as a prelude to the detailed description that is to follow.

The present invention provides a self-centering tactile thumb joystick for use to control a virtual directional pad on a touch screen of an electronic device, such as, smartphones, ipads, remote controllers for smart television sets and so on that require navigation inputs.

In one embodiment, the present invention provides a thumb joystick for use on or over a touch screen of an electronic device. The thumb joystick comprises: a hollow housing having an upper opening and a wall element disposed around said upper opening; a puck being disposed below said upper opening so that a stem extends through said upper opening for connection with a button disposed above said hollow housing; a resilient member disposed in an extended state and inwardly biasing against both said wall element and puck to centre said puck with respect to said upper opening; a film covering a bottom face of said hollow housing and enclosing said puck and resilient member within said hollow housing; and a tacky layer disposed on said film so that said thumb joystick is removeably mountable on said touch screen, such that when said puck is positioned above a virtual directional pad displayed on said touch screen, said virtual directional pad is operable by a user moving said puck via said stem and button.

In one embodiment of the thumb joystick, the resilient member is an annular spring or a garter spring. In another embodiment, the housing is made from a polymer, glass, ceramic or other non-electrostatic dissipative (ESD) material. In another embodiment, the puck, stem and button are made of an electrically conductive or ESD material.

In another embodiment of the thumb joystick, the tacky layer comprises a silicone, or polyurethane adhesive layer; a plasticized polyvinyl chloride layer; a layer with micro openpores (micro suction cups); or a static vinyl layer. The tacky layer is substantially about 50 micron to about 500 micron in thickness.

In another embodiment of the thumb joystick, the film is made from polycarbonate, polyethylene terephthalate (PET) or polyester, with a thickness of substantially about 50 micron to about 150 micron. When the film is a polymer, the thumb joystick further comprises a glide layer disposed on an inner face of the polymer film. When the glide layer is a polymer, the surface on which the puck is operable to slide is deposited with a hard coating. A sticker may be disposed between the film and glide layer.

In another embodiment of the thumb joystick, it further comprises a non-abrasive disc disposed on a sliding face of the puck. Preferably, the total thickness of the tacky layer, film, glide layer, sticker and non-abrasive disc is substantially 900 micron or less.

In another embodiment of the thumb joystick, wherein a peripheral, side edge of said hollow housing has a grooved, tapered or rimmed surface to allow a positive grip by a user's thumb and finger. Preferably, a holder is provided to keep the joystick when not in use. The holder may be a magnetic holder, a holder having a suction layer containing micro openpores (micro suction cups), a twist-and-turn holder or a flip case.

In another embodiment of the thumb joystick, wherein the puck is thick so that when assembled with said garter spring, a top surface of said thick puck is above the centre of said garter spring. In another embodiment, the puck is thin but has a component puck disposed in contiguous contact with the thin puck. In yet another embodiment, the wall element is formed as an insert. The peripheral edge of the thick puck, component puck or wall element insert may be curved, V-grooved or straight.

BRIEF DESCRIPTION OF THE DRAWINGS

This invention will be described by way of non-limiting embodiments of the present invention, with reference to the accompanying drawings, in which.

DETAILED DESCRIPTION

Figure 1A:
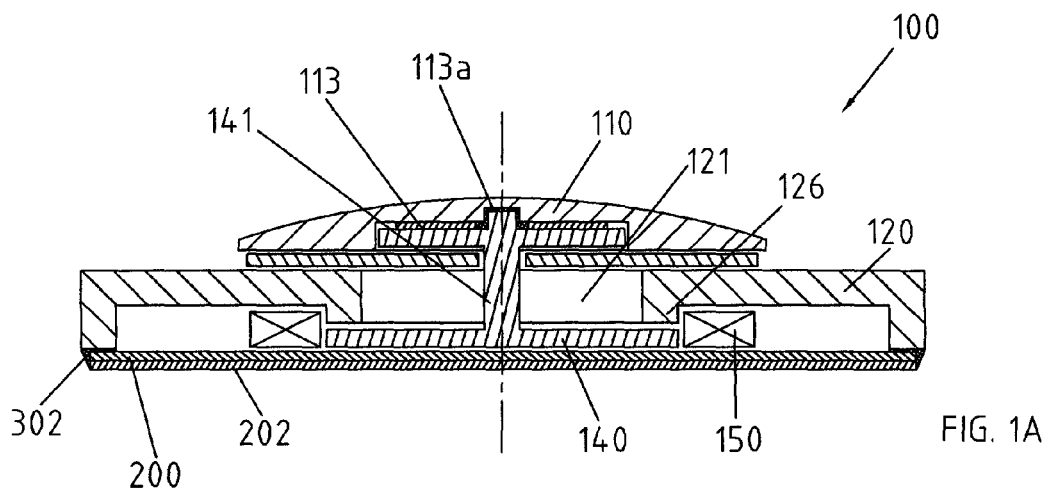
FIG. 1A illustrates a self-centering tactile thumb joystick in sectional view for use on a capacitive touch screen of an electronic device according to an embodiment of the present invention.

One or more specific and alternative embodiments of the present invention will now be described with reference to the attached drawings. It shall be apparent to one skilled in the art, however, that this invention may be practised without such specific details. Some of the details may not be described at length so as not to obscure the invention. For ease of reference, common reference numerals or series of numerals will be used throughout the figures when referring to the same or similar features common to the figures. Features similar or having similar functions to those in the priority application are also denoted by similar reference numerals.

FIG. 1A shows a self-centering tactile thumb joystick 100, in sectional view, for use on or over a touch screen 10 of an electronic device according to an embodiment of the present invention. Preferably, the touch sensing system 14 is of a capacitive type. As shown in FIG. 1A, the thumb joystick 100 includes at least a button 110, a hollow housing 120, a puck 140, a resilient member in the form of an annular spring 150, and a film 200.

An upper part of the hollow housing 120 has a central opening 121. A stem 141 extends from the puck 140 and projects out of the opening 121. At the free end of the stem 141 is fixed the button 110, which a user operates on, for example, with one's thumb or finger. The opening 121 has a size that is larger than stroke movement of the button 110 after taking into account thickness of the stem 141. The hollow housing 120 has a wall element 126 that is formed around the opening 121 such that the profile shape and dimensions of the wall element 126 correspond to those on a periphery of the puck 140 so that an inner circumferential surface of the annular spring 150 contacts both the wall element 126 and periphery of the puck 140. Preferably, the height of the wall element 126 measured from an interior face of the hollow housing 120 is substantially the same as thickness of the puck 140; in other words, about half the height of the annular spring 150 is in contact with the wall element 126 and the other half height is in contact with the peripheral edge of the puck 140. As can be appreciated later, the annular spring 150 is extended when the self-centering tactile thumb joystick 100 is assembled and the annular spring 150 acts on both the wall element 126 and peripheral edge of the puck 140 to form an inwardly re-centering mechanism 101 of the puck 140 (and of the button 110).

As seen in FIG. 1A, a lower part or rim of the hollow housing 120 is covered by the film 200, thereby keeping the puck 140 and the annular spring 150 assembly within the cavity inside the hollow housing 120. Preferably, the thickness of the film 200 is formed with optical quality. By the phrase "optical quality", it means that the film 200 does not adversely distort an image seen through the film 200. On the exterior face of the film 200, with respect to the housing 120, there is a tacky layer 202. The tacky layer 202 allows the thumb joystick 100 to be removeably mounted on or over the touch screen 10 of an electronic device and removed repetitively without leaving any residue.

In one embodiment of the thumb joystick 100, the puck 140, stem 141 and button 110 are made up of an electrically conductive material or an electrostatically dissipative (ESD) material. In use, the thumb joystick 100 of the present invention is removeably mounted over a virtual directional pad displayed on the touch screen 10 of an electronic device so that the puck 140 is substantially aligned over the virtual directional pad. Directional movement or rotation of the puck 140 via the button 110 is thus transmitted as activation of the virtual directional pad for control of a software, such as a game, running on the electronic device, or for operation of a touch screen remote controller for internet surfing on a smart television set and so on.

In another embodiment of the thumb joystick 100, the hollow housing 120 is made of a polymer, glass or ceramic. Preferably, the thickness of the upper part of the hollow housing 120, that is, the part around the central opening 121 is formed with acceptable optical quality so that part of the display on the touch screen 10 seen through the hollow housing 120 is not optically distorted. In other words, the housing 120 does not substantially obstruct or distort the display on the touch screen. In one embodiment, the housing 120 is made of a clear and transparent polymer, such as polycarbonate or acrylic.

In another embodiment, the housing 120 is made of a coloured, tinted, translucent or opaque material. In another embodiment, the housing 120 is made of glass or ceramic; preferably, the glass housing 120 is tempered. Preferably, the shape of the housing 120 is round. The housing can also take other shapes, such as, polygonal, square with rounded corners and so on. Preferably, the film 200 is attached onto the hollow housing 120 using an adhesive 300, such as, an ultraviolet curable clear adhesive. Preferably, the size of the film 200 is slightly smaller than the outline of the housing 120, so that the adhesive forms a meniscus 302 around the corner formed between the bottom surface of the housing 120 and the film 200 during assembly of the self-centering tactile thumb joystick 100. Advantageously, the adhesive meniscus 302 thus formed around the film 200 minimises delamination of the tacky layer 202 from the film 200, thereby giving the thumb joystick 100 a longer service life.

In one embodiment, the tacky layer 202 is a coating of a silicone adhesive of substantially about 50 micron to about 500 micron in thickness. In another embodiment, the tacky layer 202 is disposed on a separate film, which in turn is laminated onto the film 200. In another embodiment, the tacky layer 202 is a layer of polyurethane adhesive which is coated or laminated on the film 200. The polyurethane layer 202 has a thickness of substantially about 50 micron to about 500 micron yet thin enough to allow the touch sensing system 14 to operate by sensing a capacitance change as a user's thumb or finger touches the button 110. In another embodiment, the tacky layer 202 is made of a plasticized polyvinyl chloride (PVC) material. In another embodiment, the tacky layer 202 is made up of a layer containing micro open-pores, which act like micro suction-cups. In yet another embodiment, the tacky layer 202 is made up of a static vinyl layer. The layer with micro open-pores (micro suction cups) or static vinyl layer may be laminated on a PET backing material, which may then be adhesively mounted onto the film 200. The tacky layer 202 adheres onto the touch screen 10 and allows the thumb joystick 100 to be removeably mounted on and removed from the touch screen repetitively without leaving any residue. The adhesive-based tacky layer and layer with micro open-pores (micro suction cups) can adhere onto both smooth and matt screen surfaces. However, the static vinyl tacky layer 202 can only stick onto smooth screen surfaces because the adhesion relies on Van de Waals forces. The tacky layer 202 is different from conventional screen protection film. The conventional screen protection film is generally very thin and has a very thin adhesive layer of about 30 micron; they are thus not meant to be peeled off and attached onto the screen surface repetitively. In contrast, the tacky layer 202 is durable and washable. The film 200 may be made from polycarbonate (PC), polyethylene terephthalate (PET) or polyester, whose thickness is substantially 50 micron to about 150 micron. Preferably, the total thickness of the film 200 and the tacky layer 202 is between about 100 micron and 650 micron when the puck 140, stem 141 and button 110 are electrically conductive or electrostatically dissipative (ESD). A total thickness of the film 200 and tacky layer 202 exceeding about 650 micron may reduce sensitivity of the touch sensing system 14.

As seen in FIG. 1A, a bottom surface of the button 110 is formed with a recess 113. Near the centre of the recess 113, there is formed a nipple or depression 113a. The end of the stem 141 is shaped and dimensioned to fit with both the recess 113 and nipple 113a. During assembly of the button 110 onto the stem 141, a conductive adhesive is dispensed in the nipple 113a whilst a stronger structural adhesive is dispensed in the recess 113 away from the nipple 113a. In use, the conductive adhesive allows the puck 140 and the button 110 to be at least electrostatically dissipative (ESD), thereby allowing the touch sensing system 14 of the touch screen 10 to be operable via the thumb joystick 100, whilst the structural adhesive ensures that the button 110 is securely connected to the stem 141. Preferably, an upper surface of the button 110 on which a user's thumb or linger operates on is convex and knurled for a more positive grip or feel.

Figure 1B:
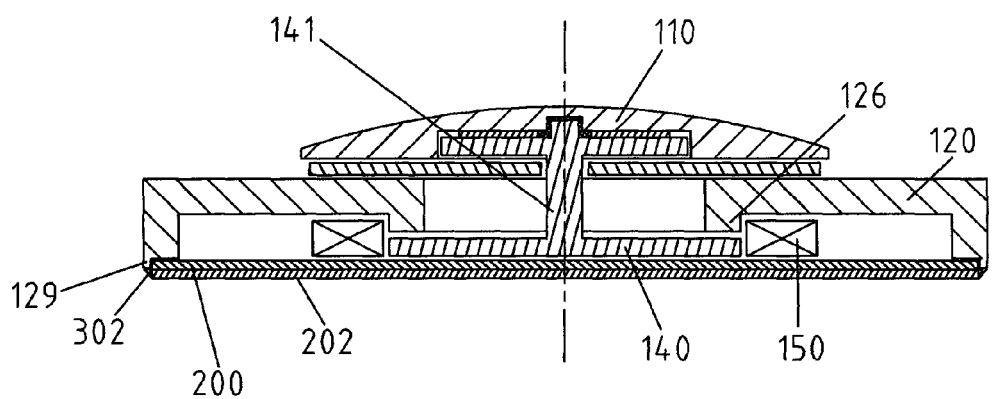
FIG. 1B illustrates a variation of the housing of the thumb joystick.

FIG. 1B illustrates a variation of the housing 120 shown in FIG. 1A. The rim at the bottom part of the housing shown in FIG. 1B has a stepped surface 129. The height of the step is lower than the total thickness of the film 200 and tacky layer 202. In a later embodiment, it will be apparent that the height of the step is also lower than the total thickness of the film 200, tacky layer 202 and a glide layer 220, when the glide layer 220 extends into the rim of the housing 120. The stepped surface 129 is provided to minimise delamination of the layered materials connected at the rim of the housing 120 after prolonged usage. Additionally, the corners formed at the stepped surface and the layered materials also allow the adhesive meniscus 302 to form around the rim of the housing during assembly.

Figure 2:
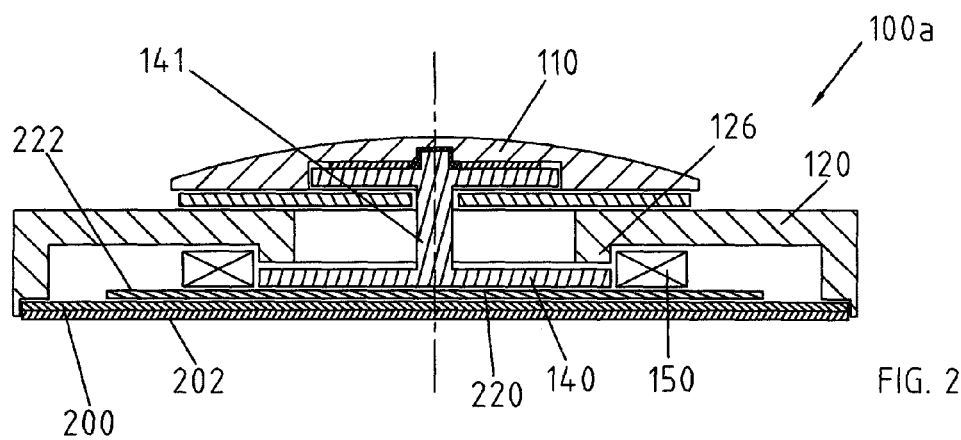
FIG. 2 illustrates a self-centering tactile thumb joystick having a glide layer according to another embodiment of the present invention.
Figure 9A:
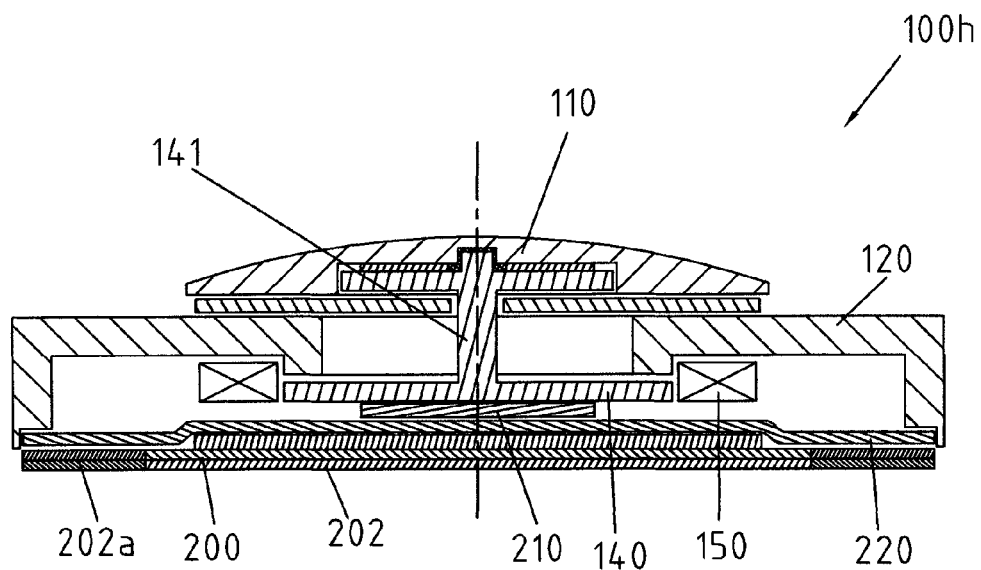
FIGS. 9A and 9B illustrate two ways of configuring the tacky film according to other embodiments of the present invention.

FIG. 2 shows a thumb joystick 100a according to another embodiment of the present invention. The thumb joystick 100a is similar to embodiment 100 shown in FIG. 1A or 1B except that the glide layer 220 is adhesively disposed or mounted on the inside surface of the film 200. The glide layer 220 is preferably clear, generally of about 50 micron thick. In one embodiment, the glide layer 220 is made of a polymer, such as polyethylene terephthalate (PET) or polycarbonate. The top surface of the glide layer 220, which the puck 140 moves on, has a hard coating 222. The hard coating 222 provides a scratch resistant surface. In one embodiment, the glide layer 220 covers an area big enough for the puck 140 to slide on; in another embodiment, the glide layer 220 is as big as the film 200 and it extends into the rim at the bottom of the housing 120, as shown in FIG. 9A.

It is possible that the glide layer 220 of the thumb joystick 100a is made of glass. With the glide layer 220 being made of glass, the hard coating 222 becomes optional. The glass glide layer 220 is thin, for example, substantially about 300 micron to about 500 micron such that the total thickness of the tacky layer 202, film 200 and glass glide layer 220 is not more than about 800 micron thick, so that the thumb joystick 100a does not adversely affect operation of the touch sensing system 14.

Figure 3:
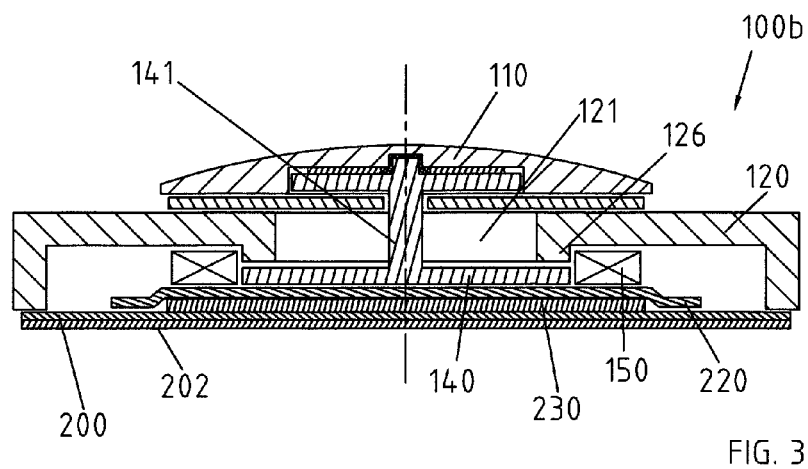
FIG. 3 illustrates a self-centering tactile thumb joystick having a sticker according to another embodiment of the present invention.

FIG. 3 shows a thumb joystick 100b according to another embodiment of the present invention. The thumb joystick 100b is similar to the embodiment 100a except that between the glide layer 220 and the inside surface of the film 200, there is a sticker 230. The sticker 230 may carry a tradename/logo of the present inventor/licensee or an advertisement. The sticker 230 may be adhered onto the inside surface of the film 200 or glide layer 220. Preferably, the sticker 230 is substantially about the size of the annular spring 150 so that it leaves an annular area around the housing 120 that a user can see through from the top of the thumb joystick 100b to the touch screen 10 display.

Figure 4A:
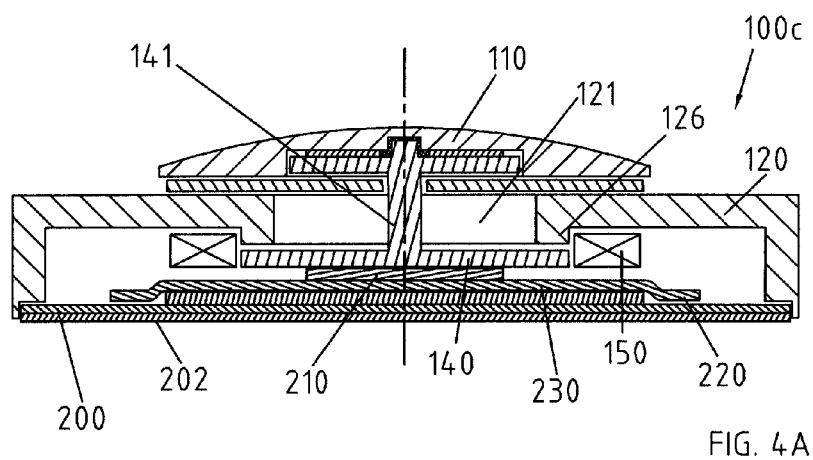
FIG. 4A illustrates a self-centering tactile thumb joystick having a non-abrasive disc according to another embodiment of the present invention, whilst
Figure 4B:
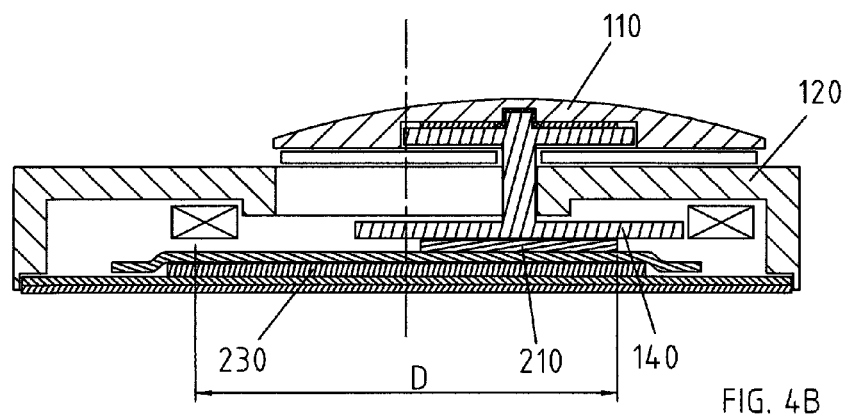
FIG. 4B illustrates the self-centering tactile thumb joystick in an activated position so that the smudge area is controlled.

FIG. 4A shows a thumb joystick. 100c according to another embodiment of the present invention. This embodiment is similar to the thumb joystick 100*b* shown in FIG. 3 except that a non-abrasive disc 210 is adhesively disposed on a lower face of the puck 140. The non-abrasive disc 210 is made preferably of an ESD teflon or an ESD ultra-high molecular weight (UHMW) plastic. The non-abrasive disc 210 is to minimise sliding friction on the glide layer 220. The non-abrasive disc 210 may also help to minimise scratching of the puck 140 on the glide layer 220. Preferably, the size of the non-abrasive disc 210 is smaller than the puck 140. As seen in FIG. 4B, with the non-abrasive disc 210 being smaller than the puck 140, when the inside surface of the film 200 becomes dirty, for example, after prolonged use or dust ingress, the diameter of smudges is controlled to within a diameter D. Preferably, the smudge diameter D is equal to or less than the size of the sticker 230. In addition, to allow smoother sliding of the puck 140 on the inner surface of the film 200, a small amount of lubricant is dispensed at the sliding interface.

Figure 5:
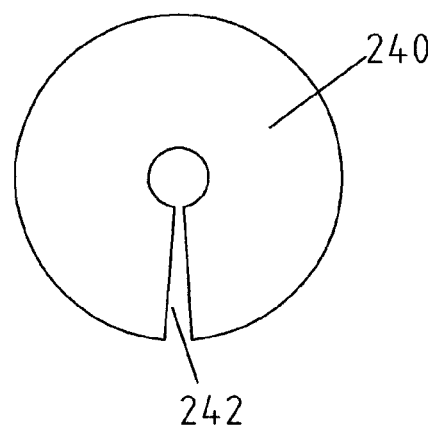
FIG. 5 illustrates a washer for use in a self-centering tactile thumb joystick according to another embodiment of the present invention.

FIG. 5 shows a washer 240 for use with the above thumb joystick. The washer 240 is a flat, annular disc with an opening 242 in its annular face. The opening 242 of the washer 240 allows the washer 240 to be inserted between the button 110 and the housing 120 so that its inner circumference is dimensioned to engage with the stem 141. In use, the thickness of the washer 240 is slightly less than the gap between the button 110 and the housing 120 so that the puck 140, non-abrasive disc 210, glide layer 220 and film 200 are contiguous and the touch sensing system 14 remains operative. Advantageously, the washer 240 minimises wobbling of the button 110 or minimises damage caused by excessive force exerted on the button 110. In addition, the washer 240 acts like a seal and minimises ingress of dust, liquid or foreign bodies into the cavity of the hollow housing 120. In a variation, the washer 240 is made from a sponge.

Figure 6:
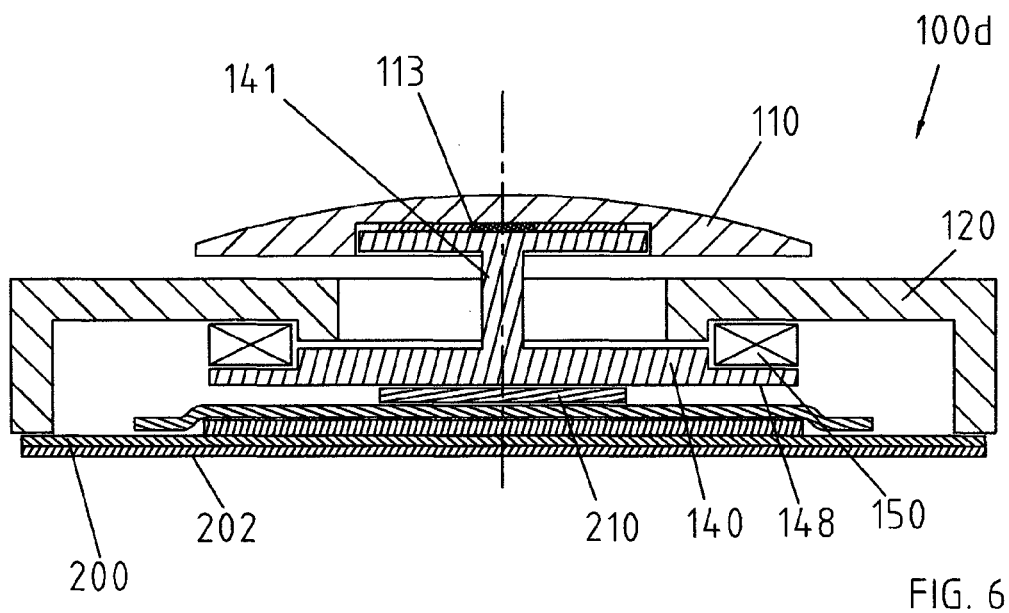
FIG. 6 illustrates a self-centering tactile thumb joystick with a puck having a flange according to another embodiment of the present invention.

FIG. 6 shows a thumb joystick 100*d* according to another embodiment of the present invention. As shown in FIG. 6, the puck 140 has a stepped periphery. The step periphery substantially forms a flange 148 to support the annular spring 150. This embodiment is useful in that the flange 148 prevents edges of the annular spring 150 from sliding contact on the film 200 or glide layer 220. Also as seen in FIG. 6, the bottom surface of the button 110 has only the recess 113. Without the nipple 113*a*, the conductive adhesive is dispensed near the centre of the recess 113 whilst the structural adhesive is dispensed away from the centre of the recess 113 before assembly of the button 110 on the stem 141. Alternatively, an electrostatically dissipative (ESD) sponge 113*b* may be disposed near the centre of the recess 113 during assembly of the button 110 on the stem 141 to provide an ESD path through the stem 141 and button 110 for the touch sensing system 14 to be operable.

Figure 7:
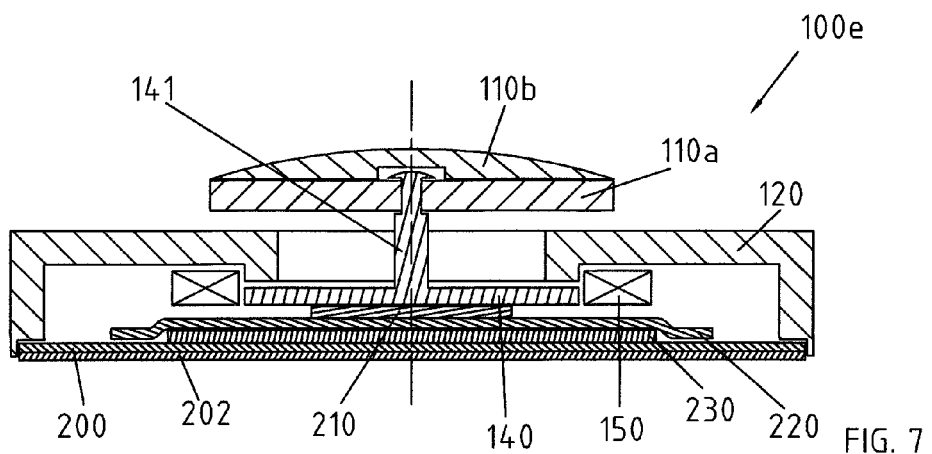
FIG. 7 illustrates a self-centering tactile thumb joystick with a two-piece button according to another embodiment of the present invention.

FIG. 7 shows a thumb joystick 100*e* according to another embodiment of the present invention. The thumb joystick 100*e* is similar to any one of the above embodiments except that the button 110 is made up of two pieces 110*a*, 110*b*. As shown in FIG. 7, the end of the stem 141 has a stepped end, which is non-circular. During assembly of the button 110 on the stem, the lower part 110*a* of the button 110 is inserted over the stem 141 so that its non-circular hole engages with the non-circular end of the stem. The free end of the stem is then expanded or deformed to attach fixedly the lower part 110B of the button onto the stem 141. Alternatively, the free end of the stem 141 is deformed into a mushroom head, for example, by riveting. After the lower part 110*a* of the button is attached to the stem 141, the upper part 110*b* of the button is attached over the lower part 110*a* with an electrically conductive adhesive.

Figure 8A:
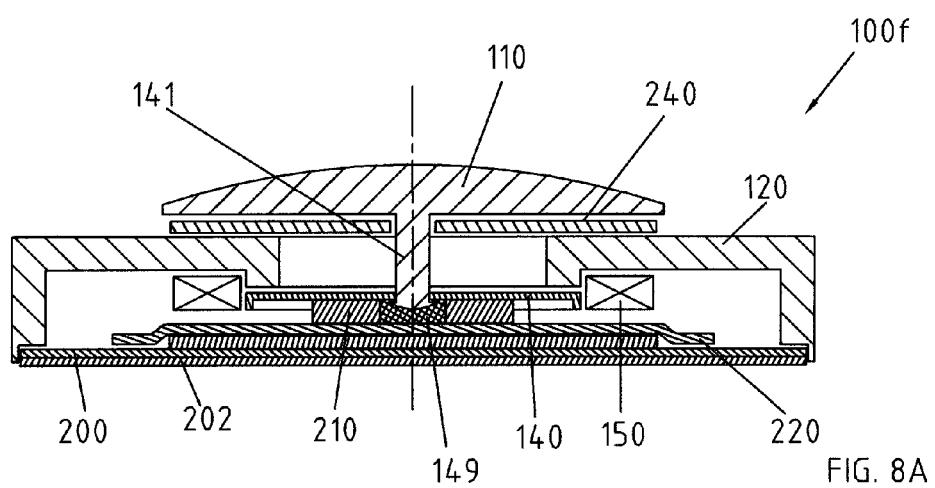
FIGS. 8A and 8B illustrate two pucks formed from a sheet metal according to other embodiments of the present invention.
Figure 8B:
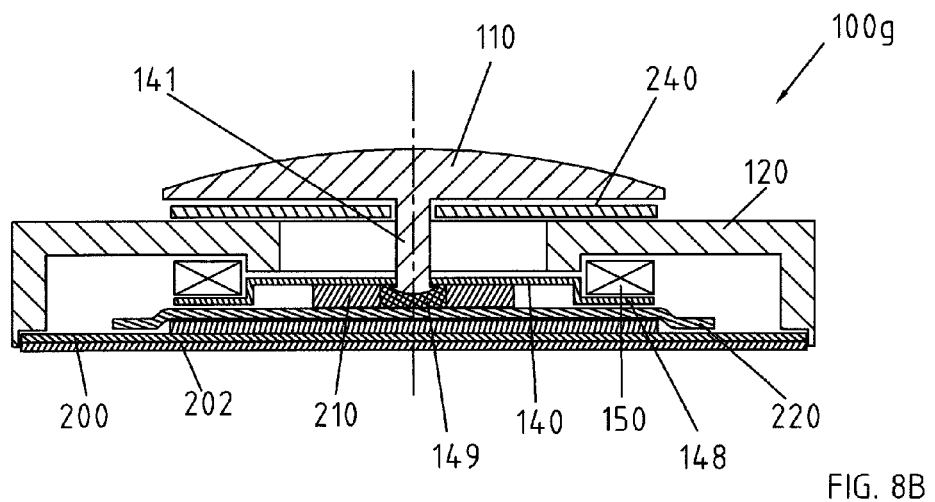

FIGS. 8A and 8B show thumb joysticks 100*f*, 100*g* according to two other embodiments of the present invention. As shown in FIGS. 8A and 8B, the button 110 and stem 141 are formed in an integral piece, whilst the puck 140 is formed from a sheet metal. The puck 140 is connected at the free end of the stem 141, for example, by mechanical interference joining, as described in the above paragraph. In thumb joystick 100*g*, the puck 140 is formed with a peripheral flange 148. On the lower part of the puck 140 is adhesively attached the non-abrasive disc 210, for example, in the form of an annular washer. As shown in FIGS. 8A and 8B, the centre of the annular washer 210 may be filled with an electrically conductive or ESD plug/insert 149.

Figure 9B:
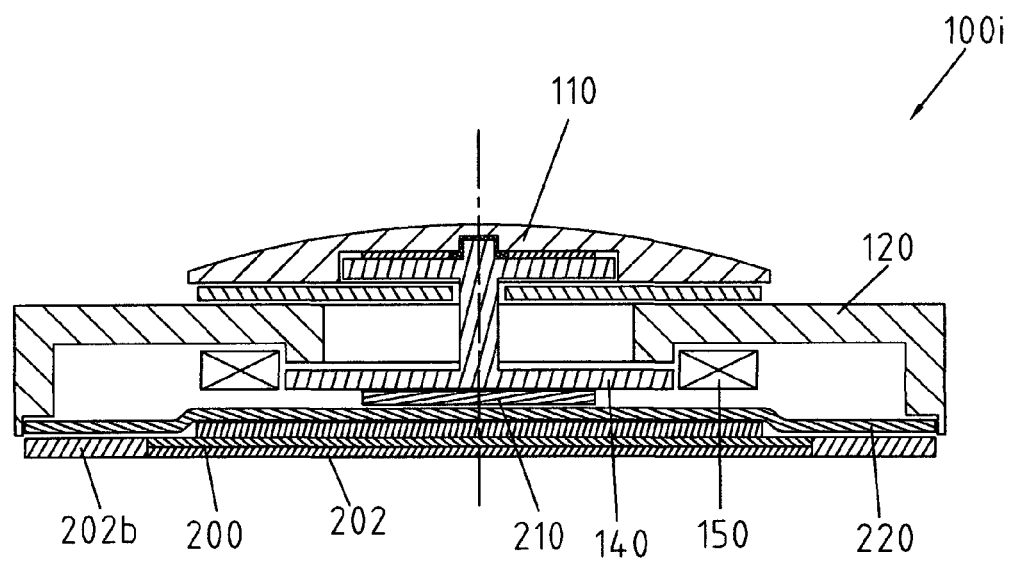

FIGS. 9A and 9B show thumb joysticks 100*h*, 100*i* according to two other embodiments of the present invention. Thumb joysticks 100*h*, 100*i* are similar to any one of the above embodiments except that the tacky layer 202 is configured into two concentric regions 202*a*, 202*b*. For thumb joystick 100*h*, the outer concentric region 202*a* of the tacky layer 202 is made from a clear tacky film, which allows a user to look through a peripheral area of the housing 120 from the top to the display on the touch screen 10 so that the central concentric region 202 of the tacky film may be made from a translucent or opaque type. For thumb joystick 100*i*, the outer concentric region 202*b* of the tacky layer 202 is non-tacky and may be made from a clear polymer film, like the film 200; alternatively (not shown in a figure), the film 200 may extend into the rim at the bottom of the housing and the outer concentric region 202*b* is laminated with a clear polymer film.

Figure 10A:
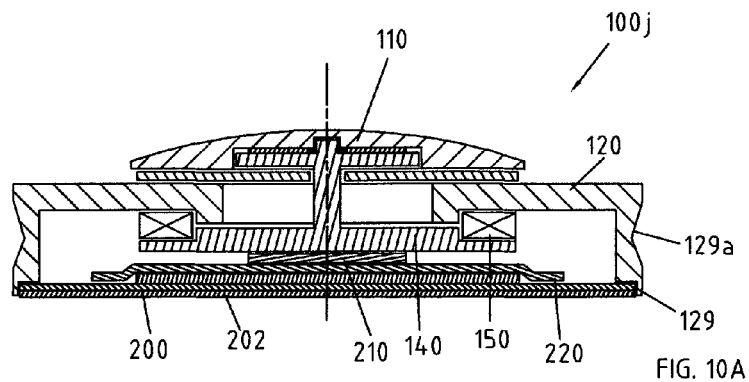
FIGS. 10A-10E illustrate self-centering tactile thumb joysticks with features on the housing according to other embodiments of the present invention.
Figure 10B:
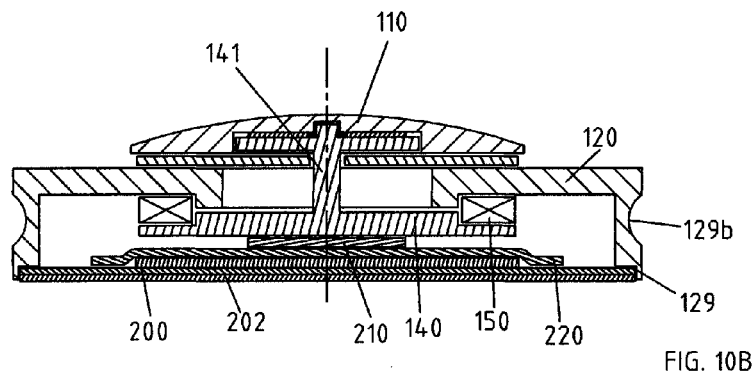
Figure 10C:
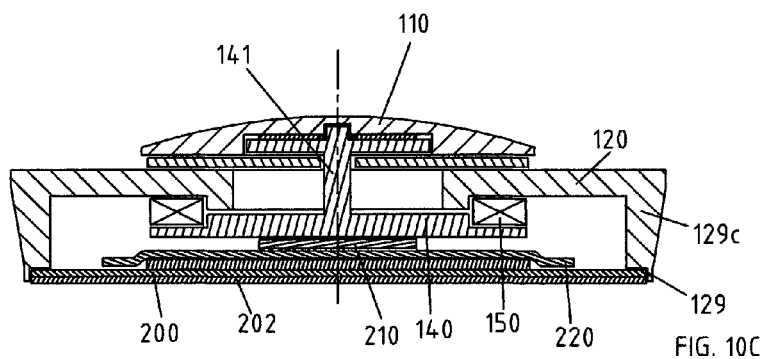
Figure 10D:
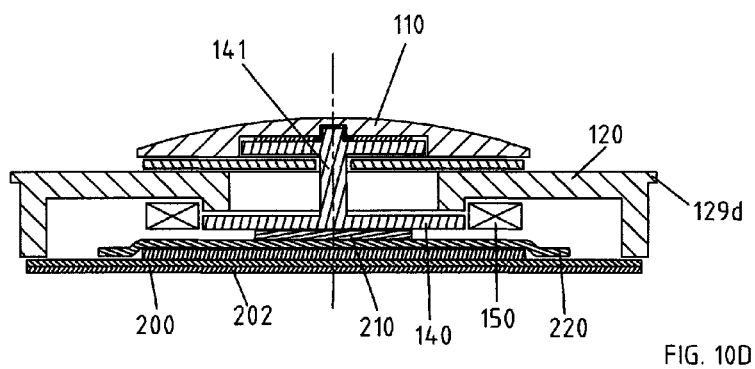
Figure 10E:
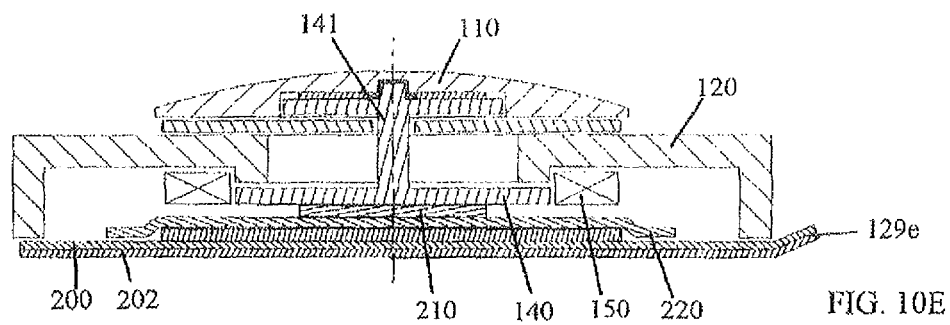

FIGS. 10A-10E illustrate a thumb joystick 100*j* with a peripheral, side edge of the housing 120 configured with an alternative feature for a more positive grip, for example, when peeling the thumb joystick from the touch screen 10 surface. For example, as shown in FIG. 10A, a V-groove 129*a* is formed around the peripheral edge of the housing 120. In FIG. 10B, a part round groove 129*b* is formed around the peripheral edge of the housing 120, in FIG. 10C the peripheral edge is tapered 129*c* whilst in FIG. 10D a rim 129*d* extends around the upper peripheral surface of the housing 120. In FIG. 10E, a part of the film 200 extends out of the outline of the housing and provides a lift tab 129*e* for a user to grip and peel the thumb joystick 100*j* from the touch screen 10 surface.

Figure 11:
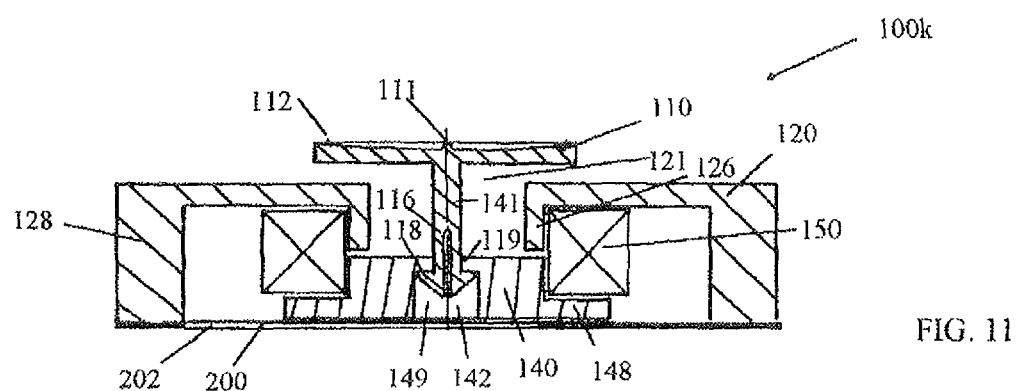
FIG. 11 illustrates a thumb joystick with lock-and-catch connection of the stem to the puck according to another embodiment of the present invention.

In another embodiment of the thumb joystick 100*k*, as shown in FIG. 11, the stem 141 is engaged with the puck 140 by means of locks and catches. For example, the end of the stein 141 has one or more split lines 116 so that locks and catches 118 at the free end of the stem 141 behave like spring elements such that when the thumb joystick 100*k* is assembled and the stem 141 is inserted into a centre hole 142 in the puck 140, the catches 118 lock on the edge of the centre hole 142. Once assembled, the stem 141 is non-rotational with respect to the puck 140; in one embodiment, the stem 141 has a prismatic cross section. After the thumb joystick 100*k* is assembled, the centre hole 142 on the puck 140 may be plugged up with the insert 149. In one embodiment, the puck 140 and insert 149 are made of a metal; in another embodiment, insert 149 is made of an electrostatic dissipative (ESD) sponge or polymer.

Also as shown in the FIG. 11, the button 110 is round and has a feature on an upper surface for a user to feel the centre of the button. For example, the centre of the button 110 has a small raised projection 111, as shown in FIG. 11. In addition or alternatively, the button 110 may have raised projected segments 112 located near the periphery of the button 110.

It is possible that a resilient disc 190 (not shown in the figure) be disposed around the stem 141 between the housing 120 and the button 110. The resilient disc 190 serves as a spring element to keep the assembly of the puck 140, annular spring 150 and housing 120 together. The disc 190 also serves as a dust cover to minimise dust ingress and to minimise any wobbling of the button 110 caused by operation of a user's thumb or finger. To allow the disc 190 to slide smoothly on the top of the housing 120, the peripheral edge of the disc 190 is curved up.

In the above embodiments of the thumb joystick 100, 100a-100k, the annular spring 150 is made of a metal strip whose thickness is bent to form undulating loops 152 and the resulting undulating strip is shaped into an endless spring of substantially one or more layers, as shown in FIGS. 12A-12J. As can be seen from these figures, each annular spring 150 has an inside circumference, an outside circumference and a planar thickness defined by the width of the metal strip. The metal strip is generally quadrilateral in section, such as a rectangular section, where the width to thickness ratio is more than unity, preferably ranging from about 5 to about 100. The edges defining the width or thickness of the metal strip need not be straight; they may be curvilinear and may even have a gentle feature, such as a grooved surface.

Figure 12A:
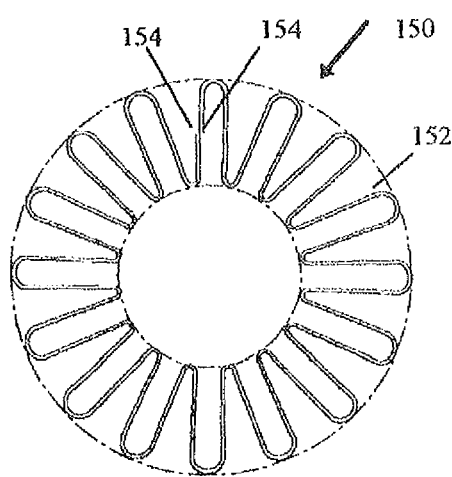
FIGS. 12A-12J illustrate different configurations of the annular spring for use with the above self-centering tactile thumb joysticks of the present invention.
Figure 12B:
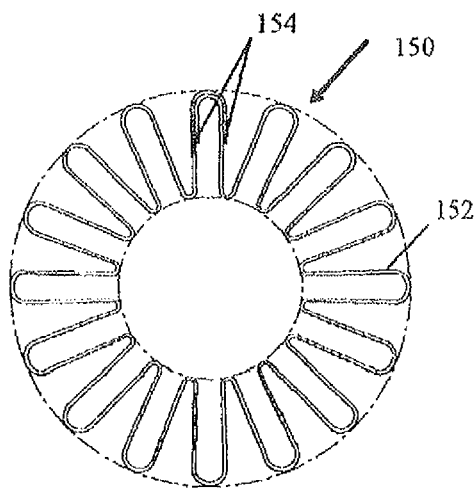

FIG. 12B shows that ends 154 of the annular spring 150 are located on different loops 152. Substantially two layers may mean that the ends 154 are a few loops short of forming two complete rounds around the annular spring 150; in the same manner, substantially more than one layer may mean that the ends 154 overlap a few loops after forming a complete round around the annular spring 150. With a given strip thickness, the stiffness of the annular spring 150 is substantially directly proportional to the number of layers that form the annular spring 150. In one embodiment, the ends 154 of the annular spring 150 are free. In another embodiment, the annular spring 150 is made from copper alloy.

Figure 12C:
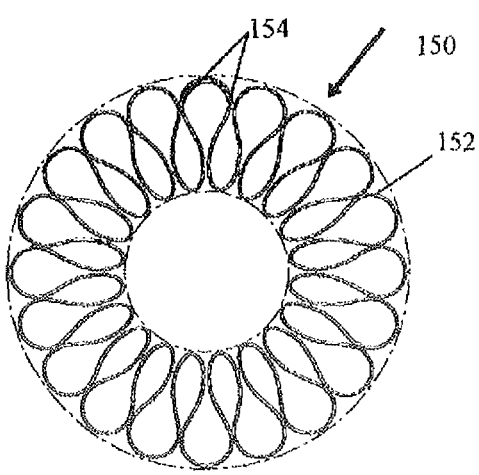
Figure 12D:
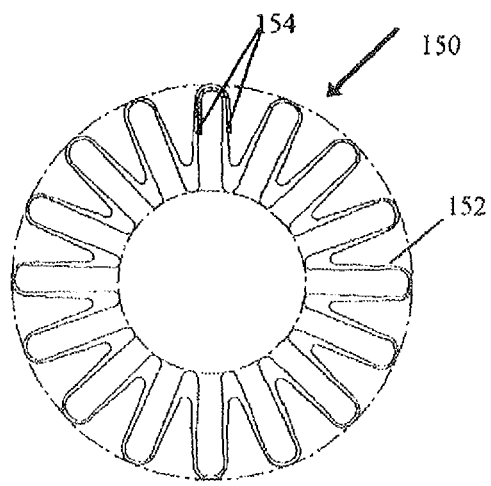

As shown in FIGS. 12A-12D, the inside circumference of the annular spring 150 is circular and has an inside diameter ID. FIGS. 12A and 12B show the spring sections joining adjacent undulating loops 152 are substantially straight. FIG. 12C shows the spring sections joining adjacent undulating loops 152 are curved. FIG. 12D shows the undulating loops 152 on separate layers are non-conformal to each other.

Figure 12E:
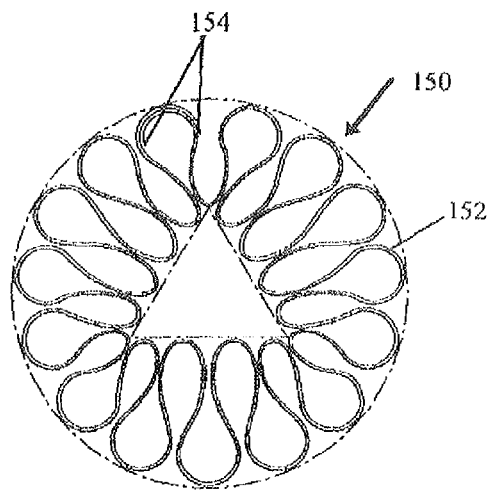
Figure 12H:
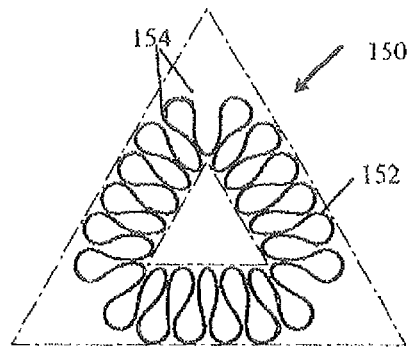
Figure 12F:
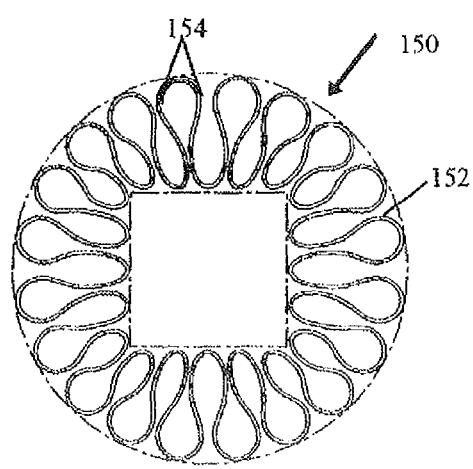
Figure 12I:
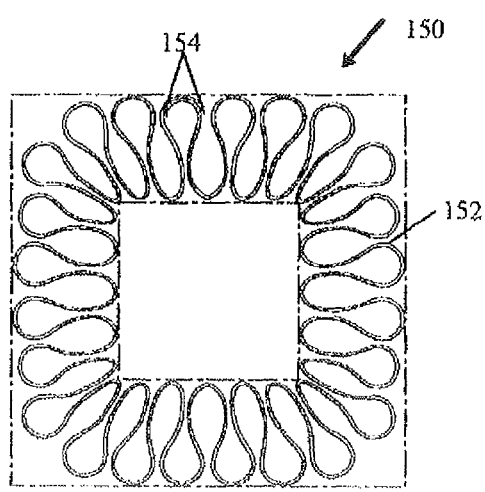
Figure 12G:
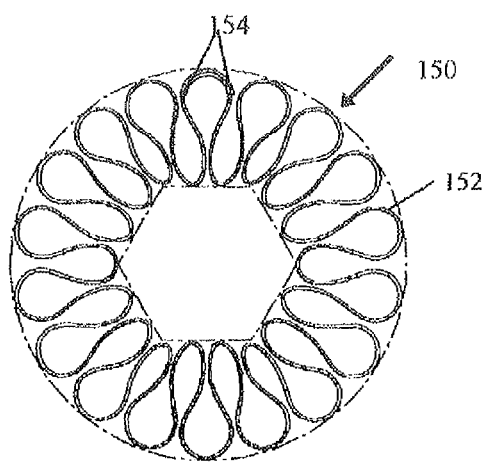
Figure 12J:
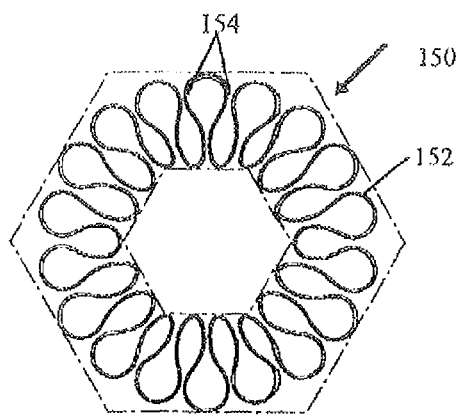

In other embodiments of the annular spring 150, as shown in FIGS. 12E-12G, the inside circumference of the annular spring 150 is non-circular. In yet other embodiments, as shown in FIGS. 12H-12J, both the inside and outside circumferences of the annular spring 150 are non-circular. In cooperation with a non-circular peripheral puck 140 and non-circular wall element 126, the annular spring 150 with non-circular inside circumference makes the puck 140 or button 110 non-rotational; this provides orientation control of the button 110, which is advantageous, for example, to maintain an orientation of a logo, mark or advertisement placed on the button 110.

The self-centering tactile thumb joysticks of the present invention have been made and have undergone testing by the inventor. The thumb joysticks 100,100a-100k have been found to be useful for controlling virtual directional pads displayed on the touch screen of smartphones, ipads, and so on. It is envisaged that the thumb joysticks will also be useful to operate virtual directional pads on touch screen remote controllers for smart television sets and so on that require navigation inputs.

In the above embodiments, the resilient member 150 can be in the form of a garter spring 150a. The garter spring 150a is a coiled extension spring which ends are interlocked to form a ring of resilient member. For example, each end of the coiled spring terminates with a hook and, in use, the hooks at the two ends are interlocked to form an endless garter spring; in another example, one end of the coiled spring is formed with a taper and, in use, the tapered end is threaded engaged with the opposite end to form an endless garter spring; in yet another example, the two ends of the coiled spring are welded together to form an endless garter spring.

Figure 13A:
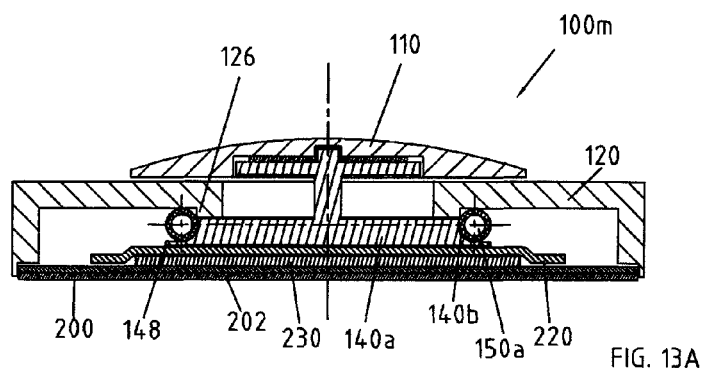
FIGS. 13A-13F illustrate thumb joysticks using garter springs according to other embodiments of the present invention.
Figure 13B:
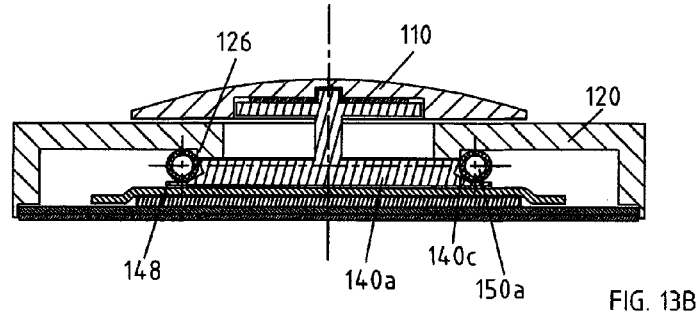
Figure 13C:
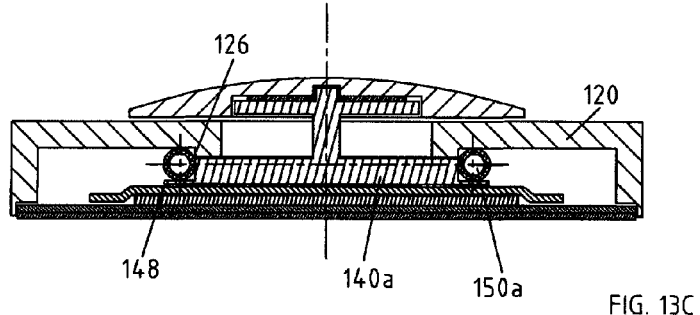
Figure 13D:
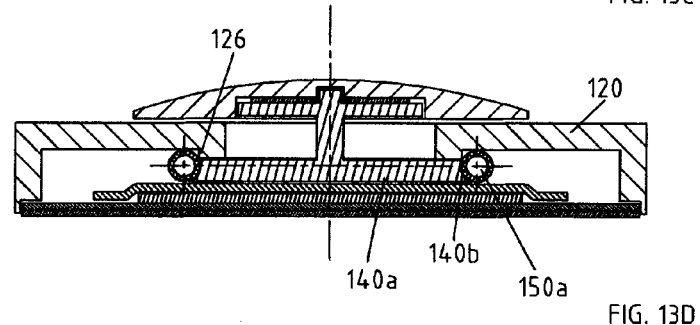
Figure 13E:
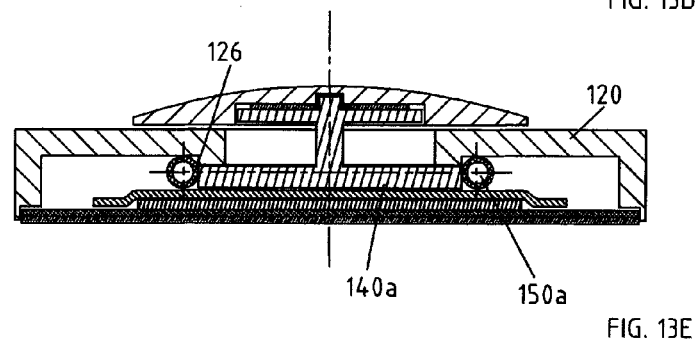
Figure 13F:
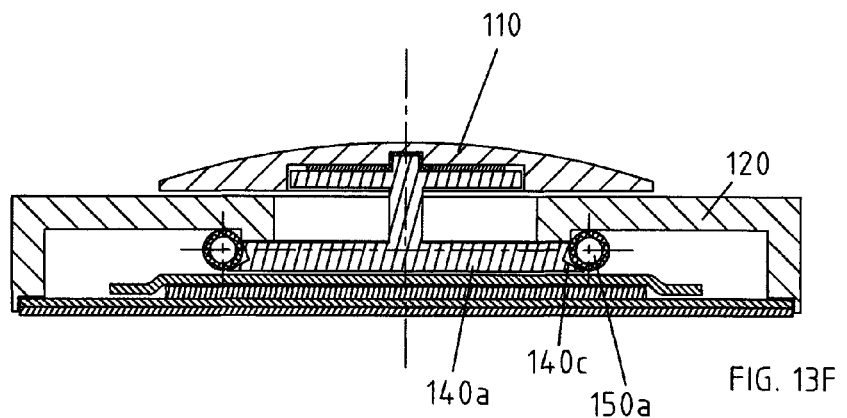
Figure 15A:
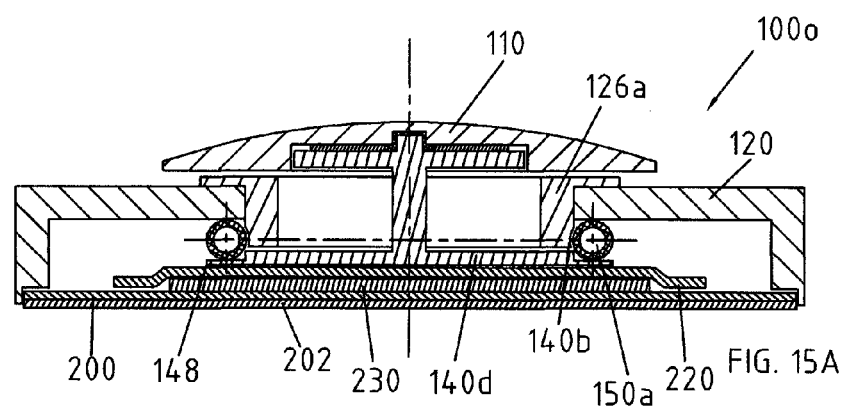
FIGS. 15A-15F and 16A-16F illustrate thumb joysticks in which the wall elements are formed as inserts according to yet other embodiments of the present invention.
Figure 15B:
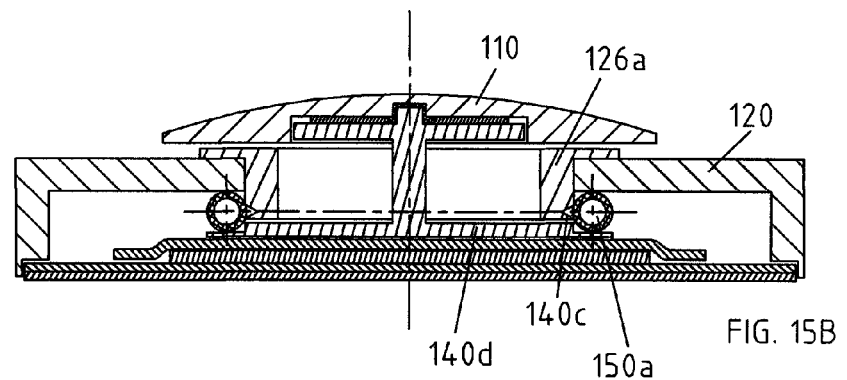
Figure 15C:
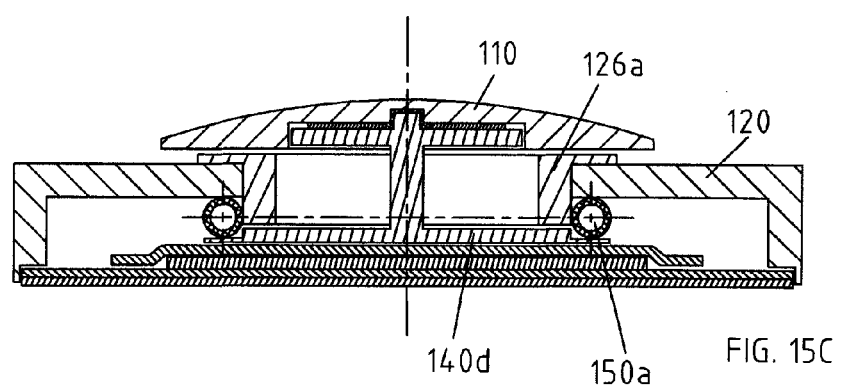
Figure 15D:
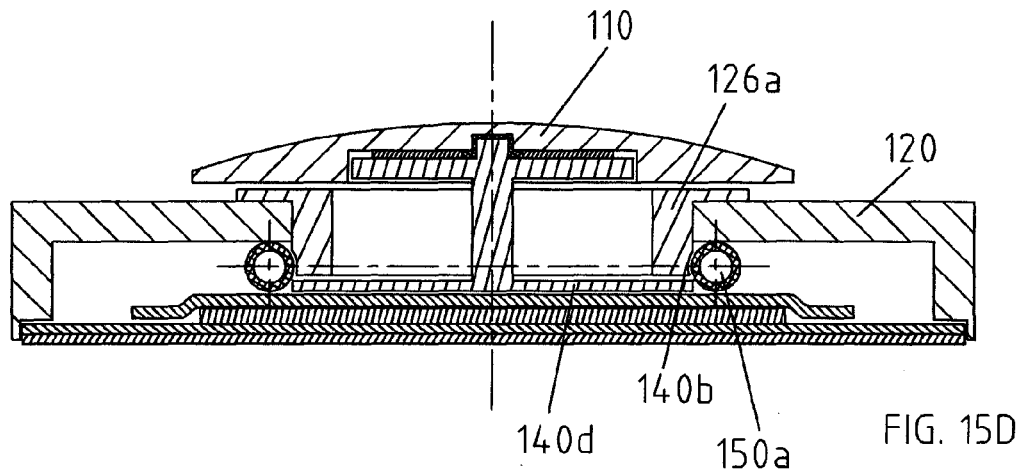
Figure 15E:
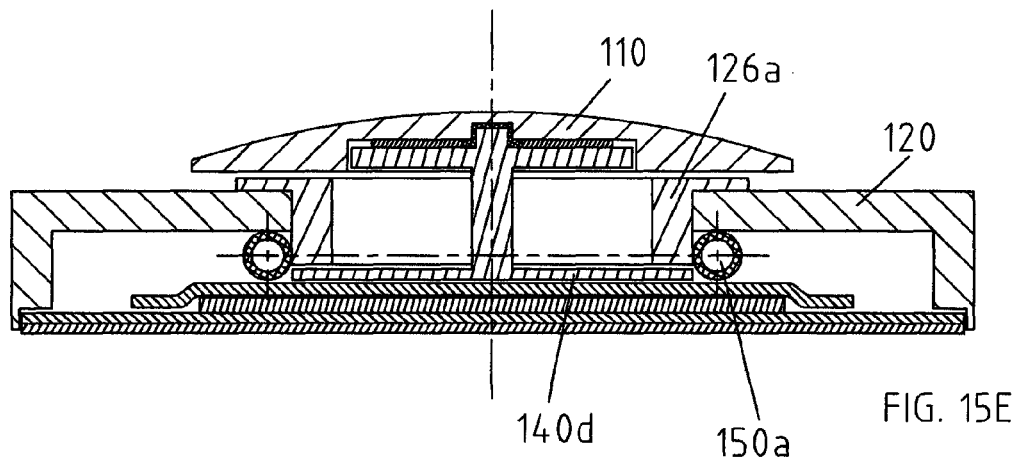
Figure 15F:
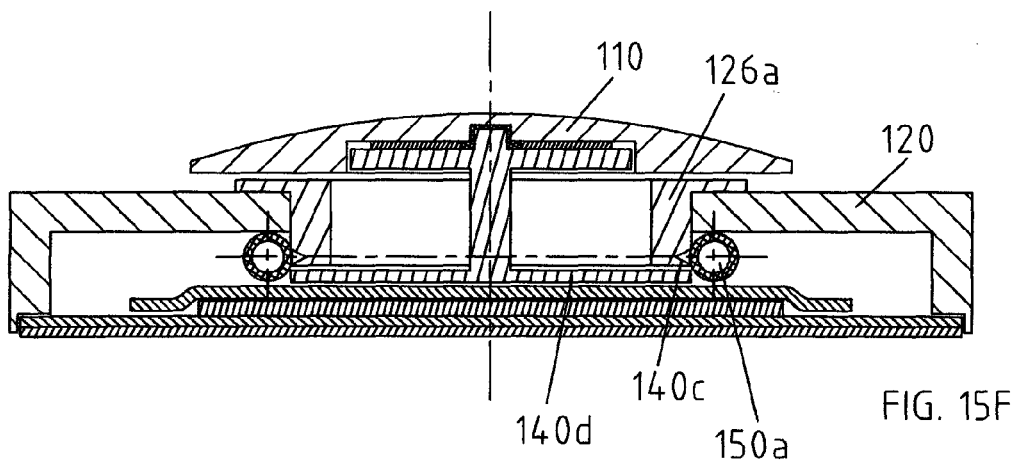
Figure 16A:
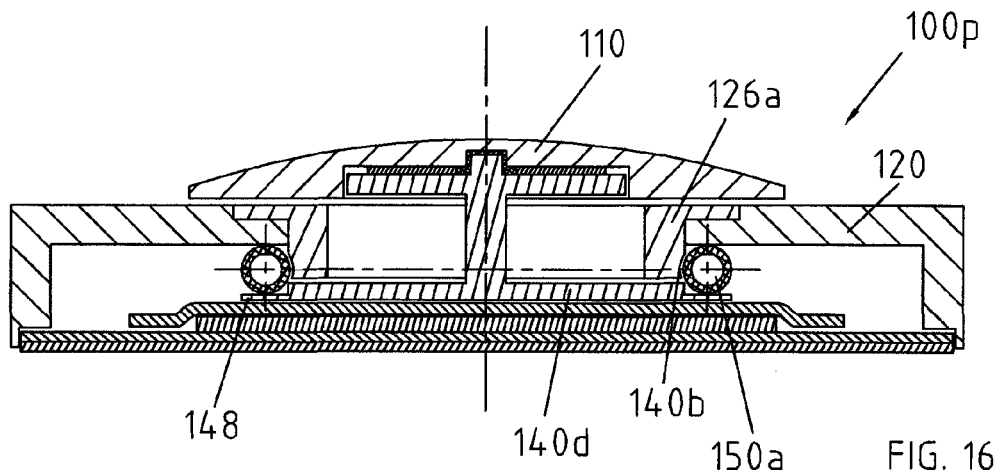
Figure 16B:
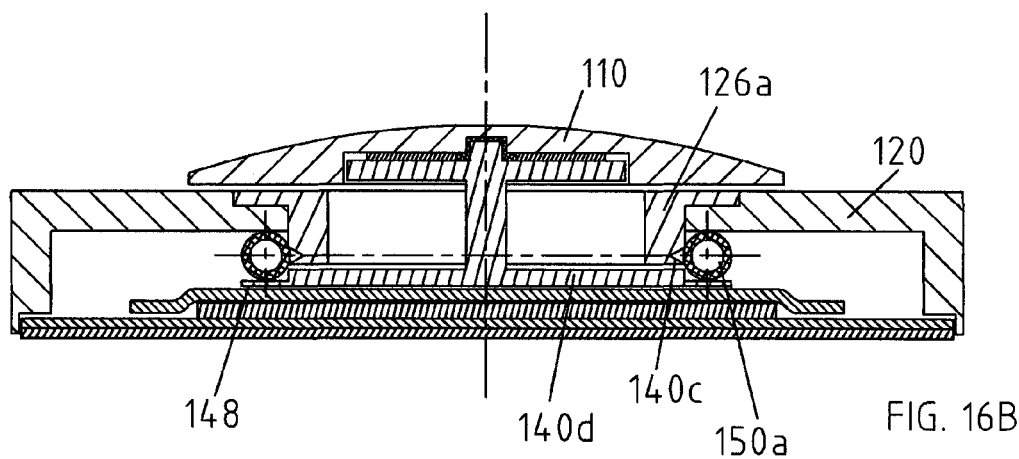
Figure 16C:
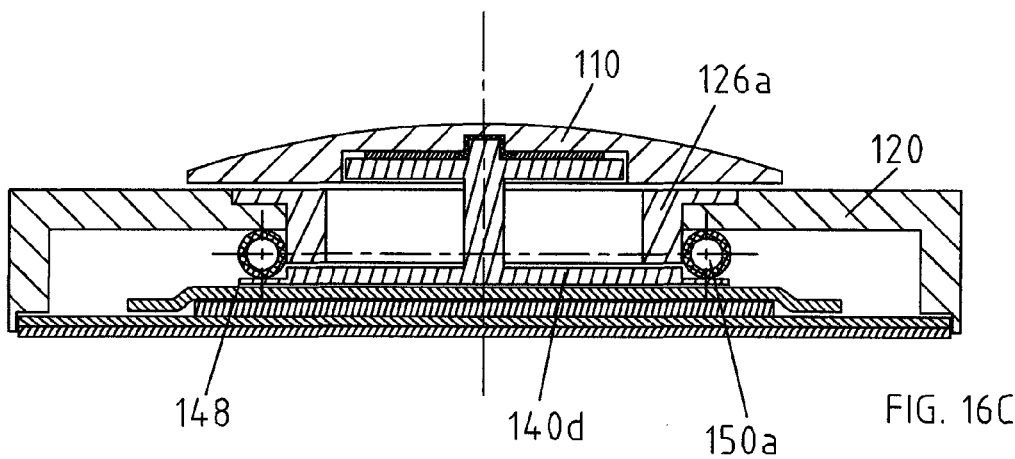
Figure 16D:
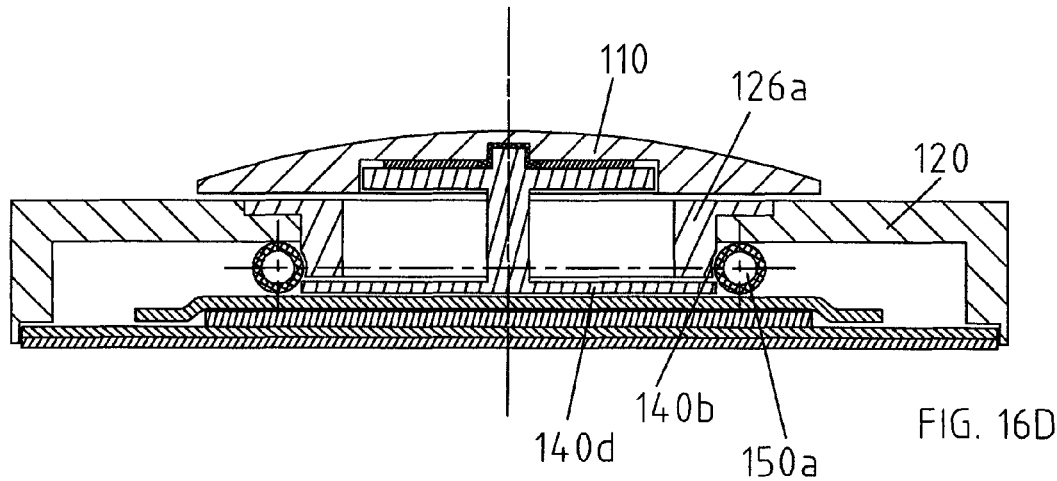
Figure 16E:
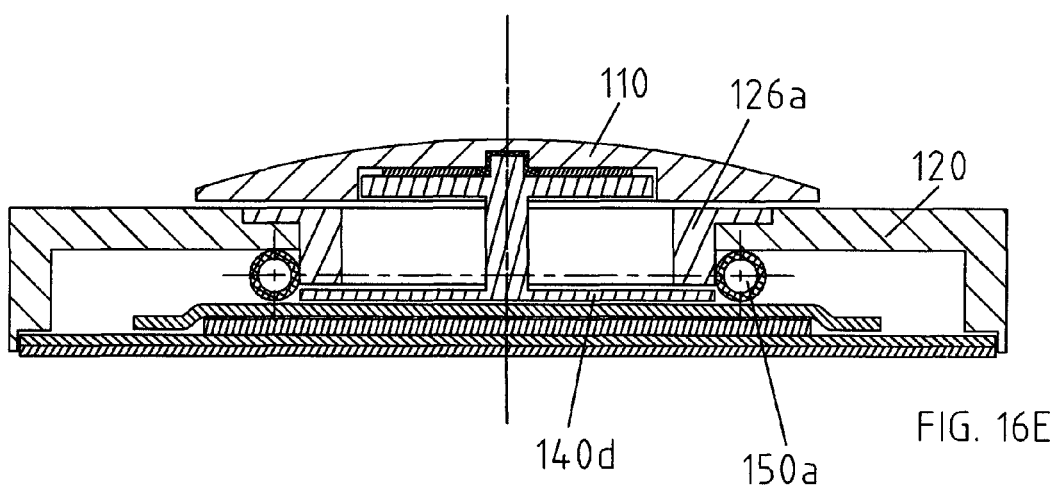
Figure 16F:
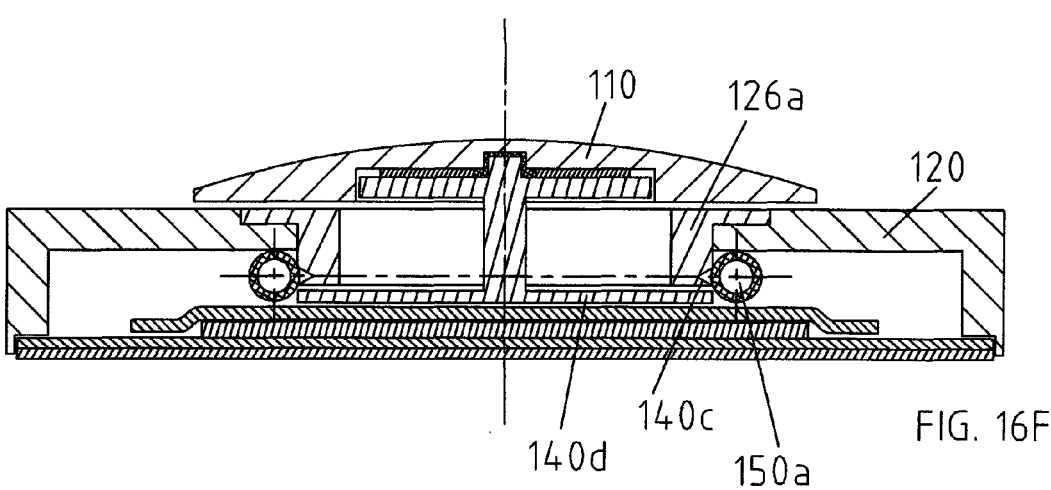

FIGS. 13A-13E show thumb joysticks 100m are configured with the garter spring 150a. As shown in fails. 13A-13E, the puck 140a is thicker than the previous embodiments such that a top surface of the puck 140a is higher than a plane along the centre line of the garter spring 150a. In FIG. 13A, the puck 140a has a flange 148 and the puck's peripheral edge 140b in contact with the garter spring 150a is curved. The curved surface 140b minimises the garter spring 150a from slipping off the puck's peripheral contact edge. The wall element 126 in contact with the garter spring 150a may also be curved. In FIG. 13B, the puck's peripheral edge is a V-groove 140c. The V-groove 140c engages positively with the garter spring 150a and also minimises the garter spring 150a from slipping of the puck's peripheral contact edge. In contrast, in FIG. 13C, the peripheral edges of both the wall element 126 and puck 140a are tangential to the garter spring 150a, whilst in FIGS. 13D-13F, the puck 140a does not have the flange 148.

Figure 14A:
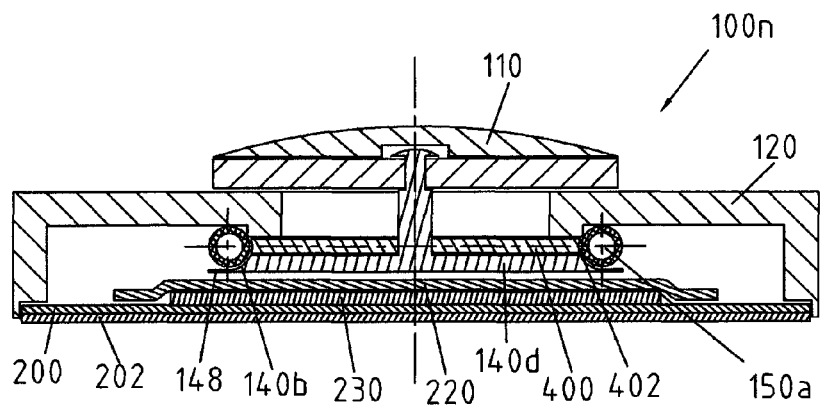
FIGS. 14A-14D illustrate thumb joysticks using garter springs according to yet other embodiments of the present invention.
Figure 14B:
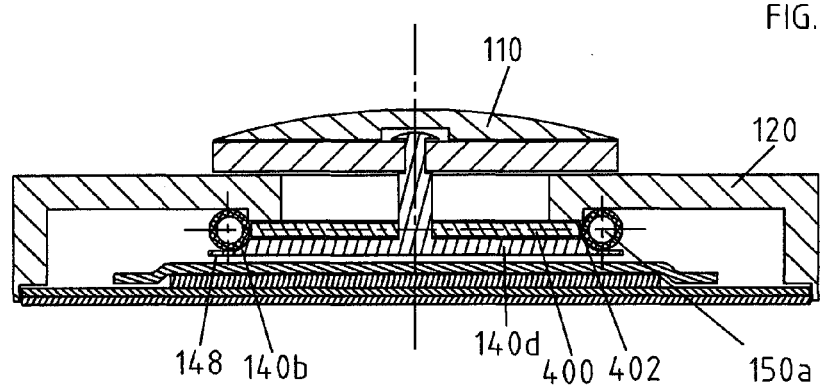
Figure 14C:
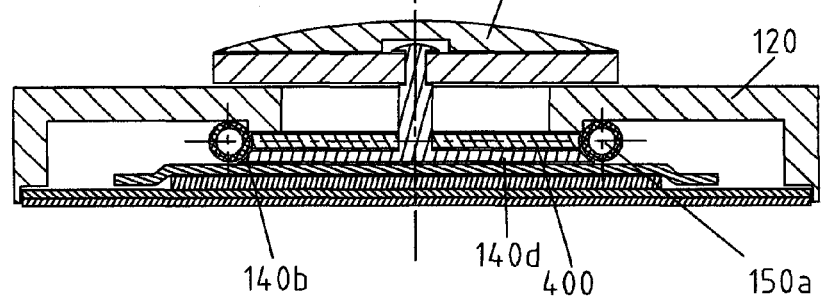
Figure 14D:
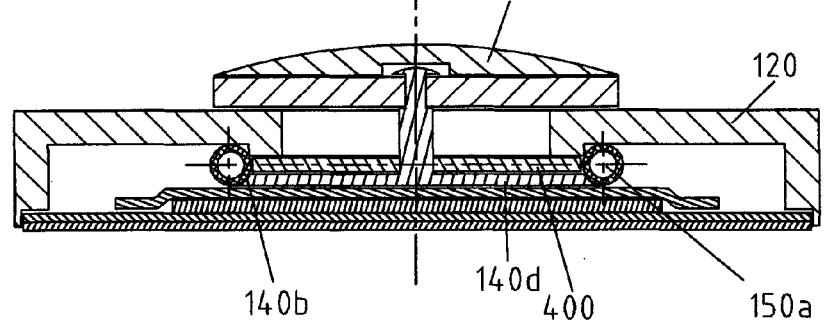

FIGS. 14A-14D show thumb joysticks 100n as variations of thumb joysticks 100m. As shown in FIGS. 14A-14D, the centering mechanism 101 is made up of a thin puck 140d, a component puck 400 disposed in contiguous contact on the thin puck 140d and the garter spring 150a. Preferably, a centre plane of the component puck 400 substantially coincides with that of the garter spring 150a. As shown in FIGS. 14A and 14C, the peripheral edge of the component puck 400 is curved to fit with the garter spring 150, whilst in FIGS. 14B and 14D, the peripheral edge of the component puck 400 is straight and is in tangential contact with the garter spring 150a. It is also possible that the peripheral edge of the component puck 400 is a V-groove.

FIGS. 15A-15F and 16A-16F show yet other embodiments of the thumb joystick 100o, 100p in which the wall element 126a is formed as an insert to the hollow housing 120. In use, the wall element 126a is thus pressed fitted, adhesively located or insert molded in the hollow housing 120. In one embodiment, a bottom surface of the wall element 126a is below a centre line of the garter spring 150a; in another embodiment, the bottom surface of the wall element 126a is above the centre line of the garter spring; in yet another embodiment, the bottom surface of the wall element 126 is along the centre line of the garter spring. An advantage of the wall element 126a being made as an insert is that it can be made of a material different from the housing material; for example, the wall element 126a can be made of a metal. In addition, the peripheral contact edge of the wall element 126a is curved, V-grooved or straight. The wall element 126a, used with the thin puck 140d, thus allows the garter spring 150a to engage positively with the wall element 126a and minimises the garter spring from slipping off the wall element's peripheral contact edge. Thumb joysticks 100p are different from thumb joystick 100o in that top surfaces of wall element inserts 126a and the hollow housing 120 are flush when assembled.

Figure 17:
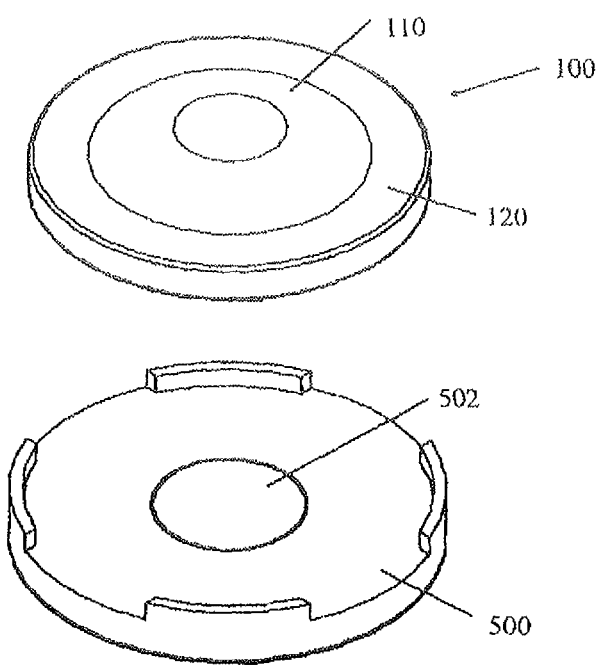
FIG. 17 illustrates a holder for storing the self-centering tactile thumb joystick of the present invention.

FIG. 17 shows a holder 500 for the thumb joystick of the present invention. As shown in FIG. 17, the thumb joystick is generally identified by numeral 100. The holder 500 has an adhesive backing, allowing it to be mounted, for example, on the back face of an electronic device employing a touch screen. Near the centre of the holder is a magnet 502 or a disc/layer 502 containing micro open-pores (micro suction cups) similar to the above embodiment of the tacky layer 202. The thumb joystick 100 is placed in the holder 500 when it is not in use. The thumb joystick 100 is held in the holder 500 by the magnet or disc/layer 502. In one embodiment, the puck 140 is made of a magnetisable material. The holder 500 thus provides a safe and convenient means of storing the thumb joystick 100, 100a-100k, 100m-100p of the present invention. It is possible that other contraception, such as, a twist-and-turn holder or flip case be used as an alternative.

While specific embodiments have been described and illustrated, it is understood that many changes, modifications, variations and combinations thereof could be made to the present invention without departing from the scope of the present invention. For example, the inside cavity of the housing 120 may be provided with a hard coating; alternatively, the hard coating on the inside cavity of the housing may be provided by adhesively attaching a film already deposited with the hard coating. The hard coating reduces wear on the housing 120 as the annular spring 150 slides in contact. In another example, the stem 141 may be threadedly connected to the puck 140 or button 110. In yet another example, the flange 148 at the periphery of the puck 140,140a,140d may be formed by attaching a disc below the puck body, such as, by spot welding or adhesive.

The invention claimed is:

1. A removable thumb joystick for mounting on a capacitive touch screen of an electronic device, said removable thumb joystick comprising:
    a hollow housing having an upper opening, a wall element disposed around said upper opening and a lower rim that opens into an interior space of said hollow housing;
    a puck having a stem and a button, with said puck being disposed below said upper opening so that said stem extends through said upper opening for connection with said button, with said button being disposed above said hollow housing;
    an endless annular spring is disposed in an extended state and inwardly biasing against both said wall element and puck to centre said puck with respect to said upper opening, wherein said endless annular spring comprises a metal strip which thickness is bent to form undulating boss;
    a film disposed over said lower rim of said hollow housing and enclosing said puck and resilient member within said hollow housing; and
    a tacky layer disposed on an exterior face of said film, with said film providing an enlarged area for adhesion onto the capacitive touch screen such that said removable thumb joystick is removeably mounted thereon, so that when said removable thumb joystick is positioned above a virtual directional pad displayed on said capacitive touch screen, said virtual directional pad is operated by capacitance change at the capacitive touch screen of the electronic device as a user moves said puck via said stem and button.

2. The removable thumb joystick according to claim 1, wherein said puck, stem and button are formed from an electrically conductive or electrostatically dissipative (ESD) material whilst said hollow housing is made from a non-ESD material, which includes a polymer, glass or ceramic.

3. The removable thumb joystick according to claim 1, wherein the resulting undulating strip is bent to form the endless annular spring of one or more layers.

4. The removable thumb joystick according to claim 1, wherein said tacky layer is substantially 50 micron to 500 micron in thickness.

5. The removable thumb joystick according to claim 1, wherein said film is made from polycarbonate, polyethylene terephthalate (PET) or polyester, with a thickness range of substantially 50 micron to 150 micron.

6. The removable thumb joystick according to claim 1, wherein a total thickness range of said tacky layer and film is substantially 100 micron to 650 micron.

7. The removable thumb joystick according to claim 1, wherein said hollow housing and film are attached to each other by an adhesive.

8. The removable thumb joystick according to claim 1, wherein said puck has a stepped peripheral edge to form a flange on which said endless annular spring is supported.

9. The removable thumb joystick according to claim 1, wherein said hollow housing has a grooved, reverse tapered or rimmed peripheral side edge to allow positive grip by a user's thumb and finger.

\* \* \* \* \*

UNITED STATES PATENT AND TRADEMARK OFFICE
CERTIFICATE OF CORRECTION

PATENT NO.         : 9,170,658 B2                                             Page 1 of 1
APPLICATION NO.    : 13/806847
DATED              : October 27, 2015
INVENTOR(S)        : Joo Hai Quek It is certified that error appears in the above-identified patent and that said Letters Patent is hereby corrected as shown below:

In the Claims

Column 11, line 41, delete "boss" and replace with "loops"

Signed and Sealed this
Twenty-sixth Day of April, 2016

Michelle K. Lee
*Director of the United States Patent and Trademark Office*